(12) United States Patent
Kitaguchi

(10) Patent No.: US 8,393,649 B2
(45) Date of Patent: Mar. 12, 2013

(54) FLANGE CONNECTION STRUCTURE

(75) Inventor: Yoshinori Kitaguchi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 221 days.

(21) Appl. No.: 12/920,354

(22) PCT Filed: Dec. 11, 2008

(86) PCT No.: PCT/JP2008/072570
§ 371 (c)(1), (2), (4) Date: Sep. 14, 2010

(87) PCT Pub. No.: WO2009/118961
PCT Pub. Date: Oct. 1, 2009

(65) Prior Publication Data
US 2011/0012338 A1   Jan. 20, 2011

(30) Foreign Application Priority Data

Mar. 25, 2008   (JP) .................................. 2008-077086

(51) Int. Cl.
*F16L 23/00* (2006.01)
(52) U.S. Cl. ............................. 285/368; 285/93; 285/12
(58) Field of Classification Search ................... 285/93, 285/368, 12, 13
See application file for complete search history.

(56) References Cited

U.S. PATENT DOCUMENTS

| | | | | |
|---|---|---|---|---|
| 3,057,646 A | * | 10/1962 | Brumagim | 285/96 |
| 3,141,685 A | * | 7/1964 | Watts | 285/93 |
| 3,884,511 A | * | 5/1975 | Hermanson | 285/93 |
| 4,288,105 A | * | 9/1981 | Press | 285/368 |
| 4,410,186 A | * | 10/1983 | Pierce, Jr. | 285/363 |
| 5,090,871 A | * | 2/1992 | Story et al. | 285/93 |
| 5,197,766 A | * | 3/1993 | Glover et al. | 285/368 |
| 5,330,720 A | * | 7/1994 | Sorbo et al. | 285/93 |
| 5,749,607 A | * | 5/1998 | Carr | 285/368 |

(Continued)

FOREIGN PATENT DOCUMENTS

| | | |
|---|---|---|
| JP | 48-7724 | 3/1973 |
| JP | 50-533498 U | 5/1975 |

(Continued)

OTHER PUBLICATIONS

Chinese Office Action issued Oct. 26, 2011 for Chinese Patent Application No. 200880127655.8 with English language translation.

(Continued)

*Primary Examiner* — David E Bochna
(74) *Attorney, Agent, or Firm* — Kanesaka Berner & Partners, LLP

(57) ABSTRACT

A flange of a first pipe and a flange of a second pipe are connected via the flanges. An annular seal groove is formed in the flange surface of the flange. A sealing liquid is poured and placed in the seal groove from a sealing liquid pouring section via a pouring passage. The sealing liquid placed in the seal groove forms a liquid seal structure to improve sealing ability. Further, the sealing liquid is placed also in a discharge passage and a discharge pipe. When gas in the pipes enters the seal groove, the gas can be discharged from a discharge device and detected by a gas sensor to enable the user to take safety measures.

5 Claims, 9 Drawing Sheets

U.S. PATENT DOCUMENTS

| | | | |
|---|---|---|---|
| 5,762,381 A * | 6/1998 | Vogel et al. | 285/368 |
| 6,000,278 A * | 12/1999 | Hystad | 73/46 |
| 6,227,575 B1 * | 5/2001 | Monning et al. | 285/368 |
| 6,241,254 B1 * | 6/2001 | Gromyko et al. | 285/368 |
| 6,299,216 B1 * | 10/2001 | Thompson | 285/368 |
| 7,942,452 B2 * | 5/2011 | Carns et al. | 285/93 |
| 2005/0081716 A1 | 4/2005 | Morita et al. | |

FOREIGN PATENT DOCUMENTS

| | | |
|---|---|---|
| JP | 55-119453 U | 8/1980 |
| JP | 61181186 U | 11/1986 |
| JP | 62-35193 A | 2/1987 |
| JP | 6040571 U | 5/1994 |
| JP | 2001289331 A | 10/2001 |
| JP | 2005-144437 A | 6/2005 |

OTHER PUBLICATIONS

ISR for PCT/JP2008/072570 mailed Jan. 27, 2009.

* cited by examiner

FLANGE CONNECTION STRUCTURE

RELATED APPLICATIONS

The present application is National Phase of International Application Number PCT/JP2008/072570 filed Dec. 11, 2008, and claims priority from, Japanese Application Number 2008-077086 filed Mar. 25, 2008.

TECHNICAL FIELD

This invention relates to a flange connection structure, which is designed to improve sealing properties by utilizing a sealing liquid in a case such as a case where pipes or the like are connected by flanges, or a case where a manhole of a tank and a cover are connected by flanges.

The present invention is designed to improve sealing properties against a fluid, especially, a fluid containing a gas.

BACKGROUND ART

In a thermal power plant or a chemical plant, many pipes are routed and arranged, and many tanks are installed. In this case, one of the pipes and another of the pipes may be connected by flanges for convenience in connecting the pipes. Also, a manhole of a tank and a cover for closing the manhole may be connected by flanges.

FIG. 9 shows a conventional flange connection structure to be applied to piping or a pipe. As shown in the drawing, a flange 2 is formed on one pipe 1, and a flange 4 is formed on another pipe 3. A gasket is interposed between a flange surface of the flange 2 and a flange surface of the flange 4, and the flanges 2 and 4 are fastened by bolts (not shown), whereby the flange surface of the flange 2 and the flange surface of the flange 4 are joined together. By so doing, the pipe 1 and the pipe 4 are coupled together.

If the pipes 1 and 3 are coupled by such a flange connection structure, it suffices to loosen and detach the bolts fastening the flanges 2 and 4, when releasing the pipes 1 and 3 for maintenance, inspection or cleaning. By this measure, the pipes 1 and 3 can be released.

In restoring the pipes 1, 3 to the original state, it is enough to perform the simple work of fastening the flanges 2 and 4 by bolts.

FIG. 10 shows a conventional flange connection structure to be applied to a tank. As shown in the drawing, a flange 12 is formed on a manhole 11 of a tank 10, and a flange 14 is formed on a cover 13. A gasket is interposed between a flange surface of the flange 12 and a flange surface of the flange 14, and the flanges 12 and 14 are fastened by bolts (not shown), whereby the flange surface of the flange 12 and the flange surface of the flange 14 are joined together. By so doing, the manhole 11 is closed by the cover 13.

If the manhole 11 is closed with the cover 13 according to such a flange connection structure, it suffices to loosen and detach the bolts fastening the flanges 12 and 14, when allowing access to the interior of the tank 10 for maintenance, inspection or cleaning. By this measure, the tank 10 can be opened.

In restoring the tank to the original state, it is enough to perform the simple work of fastening the flanges 12 and 14 by the bolts.

Patent Document 1: JP-A-2001-289331

DISCLOSURE OF THE INVENTION

Problems to be Solved by the Invention

So far, a flange connection structure for a pipe, and a flange connection structure for the manhole of a tank have been considered to be sealing structures capable of complete sealing.

With a recent plant, etc. of which higher safety and reliability are demanded, however, even the above-mentioned flange connection structures are assumed not to be necessarily perfect in sealing properties, and have been required to undergo some safety measure.

For example, if the fluid flowed through the pipes 1, 3 shown in FIG. 9 is a positive-pressure combustible gas, or if the fluid stored in the tank 10 shown in FIG. 10 is a positive-pressure combustible gas, a region a surrounding the flange connection structure shown in FIG. 9 is designated as an explosion-proof range (i.e., hazardous area), or a region 8 surrounding the flange connection structure shown in FIG. 10 is designated as an explosion-proof range.

In the region a or the region 3 designated as the explosion-proof range, an instrument or a gauge, which becomes an ignition source, has not been installed, or an instrument or gauge of a special design has been used.

So doing, however, has posed the problem that the design of the plant in limited in the degree of freedom and is costly.

If it is intended to prevent the leakage of the gas reliably in the flange connection structure for the pipe, however, the pipes are connected by welding. This measure has aroused the problem that the degree of freedom of arrangement of the pipes is lost, and inspection and cleaning cannot be carried out easily.

The present invention has been accomplished in the light of the above-described conventional technologies. It is an object of the present invention to provide a flange connection structure, such as a flange connection structure for coupling pipes together, a connection structure for tanks or instruments, or a flange connection structure for closing a manhole of a tank with a cover, the flange connection structure having enhanced sealing properties.

Means for Solving the Problems

The present invention, according to a feature for solving the above-mentioned problems, provides a flange connection structure including a flange and another flange, the flanges being fastened by bolts, whereby flange surfaces of the flanges are joined together for coupling, wherein an annular seal groove is formed in the flange surface of one of the flanges, and a sealing liquid is pressure-fed into and charged into the seal groove.

The present invention, according to another feature, provides a flange connection structure including a flange and another flange, the flanges being fastened by bolts, whereby flange surfaces of the flanges are joined together for coupling, or a flange connection structure including a flange formed in a manhole of a tank and a flange formed in a cover, the flanges being fastened by bolts, whereby flange surfaces of the flanges are joined together to close the manhole with the cover, or a flange connection structure including a flange formed in a pipe and a flange formed in a cover, the flanges being fastened by bolts, whereby flange surfaces of the flanges are joined together to close the pipe with the cover, the flange connection structure, comprising:

an annular seal groove formed in the flange surface of one of the flanges;

a pouring passage formed in the one of the flanges for bringing the seal groove and an outer surface of the one of the flanges into communication with each other, and having a sealing liquid poured thereinto from an outside; and a discharge passage formed in the one of the flanges, and communicating with the seal groove, for discharging to the outside the sealing liquid which has been poured in via the pouring passage and has filled the seal group.

The present invention, according to another feature, provides a flange connection structure including a flange formed in a pipe for flowing a fluid therethrough, and a flange formed in another pipe for flowing the fluid therethrough, the flanges being fastened by bolts, whereby flange surfaces of the flanges are joined together to couple the pipes together, or a flange connection structure including a flange formed in a manhole of a tank for storing a fluid and a flange formed in a cover, the flanges being fastened by bolts, whereby flange surfaces of the flanges are joined together to close the manhole with the cover, or a flange connection structure including a flange formed in a pipe and a flange formed in a cover, the flanges being fastened by bolts, whereby flange surfaces of the flanges are joined together to close the pipe with the cover, the flange connection structure, comprising:

an annular seal groove formed in the flange surface of one of the flanges;

a pouring passage formed in the one of the flanges for bringing the seal groove and an outer surface of the one of the flanges into communication with each other;

a discharge passage formed in the one of the flanges for bringing the seal groove and the outer surface of the one of the flanges into communication with each other;

sealing liquid pouring means connected to the pouring passage for pouring a sealing liquid into the seal groove; and a discharge device connected to the discharge passage for discharging a gas contained in the sealing liquid to an outside, while preventing the sealing liquid, which has exited from the discharge passage, from being released to the outside.

The present invention, according to another feature, is characterized in that a pouring pressure of the sealing liquid poured in by the sealing liquid pouring means is set to be lower than a fluid pressure of the fluid.

The present invention, according to another feature, provides a flange connection structure including a flange formed in a pipe for flowing a fluid therethrough, and a flange formed in another pipe for flowing the fluid therethrough, the flanges being fastened by bolts, whereby flange surfaces of the flanges are joined together to couple the pipes together, or a flange connection structure including a flange formed in a manhole of a tank for storing a fluid and a flange formed in a cover, the flanges being fastened by bolts, whereby flange surfaces of the flanges are joined together to close the manhole with the cover, or a flange connection structure including a flange formed in a pipe and a flange formed in a cover, the flanges being fastened by bolts, whereby flange surfaces of the flanges are joined together to close the pipe with the cover, the flange connection structure, comprising:

an annular seal groove formed in the flange surface of one of the flanges;

a pouring passage formed in the one of the flanges for bringing the seal groove and an outer surface of the one of the flanges into communication with each other;

a discharge passage formed in the one of the flanges for bringing the seal groove and a space, which is located on an inner peripheral side of the flange and in which the fluid is present, into communication with each other; and sealing liquid pouring means connected to the pouring passage for pouring a sealing liquid into the seal groove.

The present invention, according to another feature, is characterized in that a pouring pressure of the sealing liquid poured in by the sealing liquid pouring means is set to be higher than a fluid pressure of the fluid.

The present invention, according to another feature, is characterized in that the sealing liquid pouring means is equipped with pressure detection means for detecting a pressure of the sealing liquid poured into the pouring passage, or flow rate detection means for detecting a flow rate of the sealing liquid poured into the pouring passage, and that the flange connection structure further comprises abnormality determination means which determines that an abnormality occurred in joining of the flanges if there was a sharp decrease in the pressure detected by the pressure detection means, or if there was a sharp increase in the flow rate detected by the flow rate detection means.

Effects of the Invention

According to the present invention, the annular seal groove is formed in the flange surface of the flange, and the sealing liquid is pressure-fed into and charged into the seal groove. Thus, the liquid seal structure is composed of the sealing liquid pressure-fed into and charged into the seal groove, and can enhance the sealing properties of the flanges.

Hence, the incidence of leaks from the flange connection structure can be dramatically decreased. Consequently, the surroundings of the flange connection structure need not be designated as the explosion-proof range, and the degree of freedom to design the pipes, etc. can be raised. Since the flange connection structure can be adopted, moreover, overhaul inspection and cleaning can be performed easily.

Figure 1:
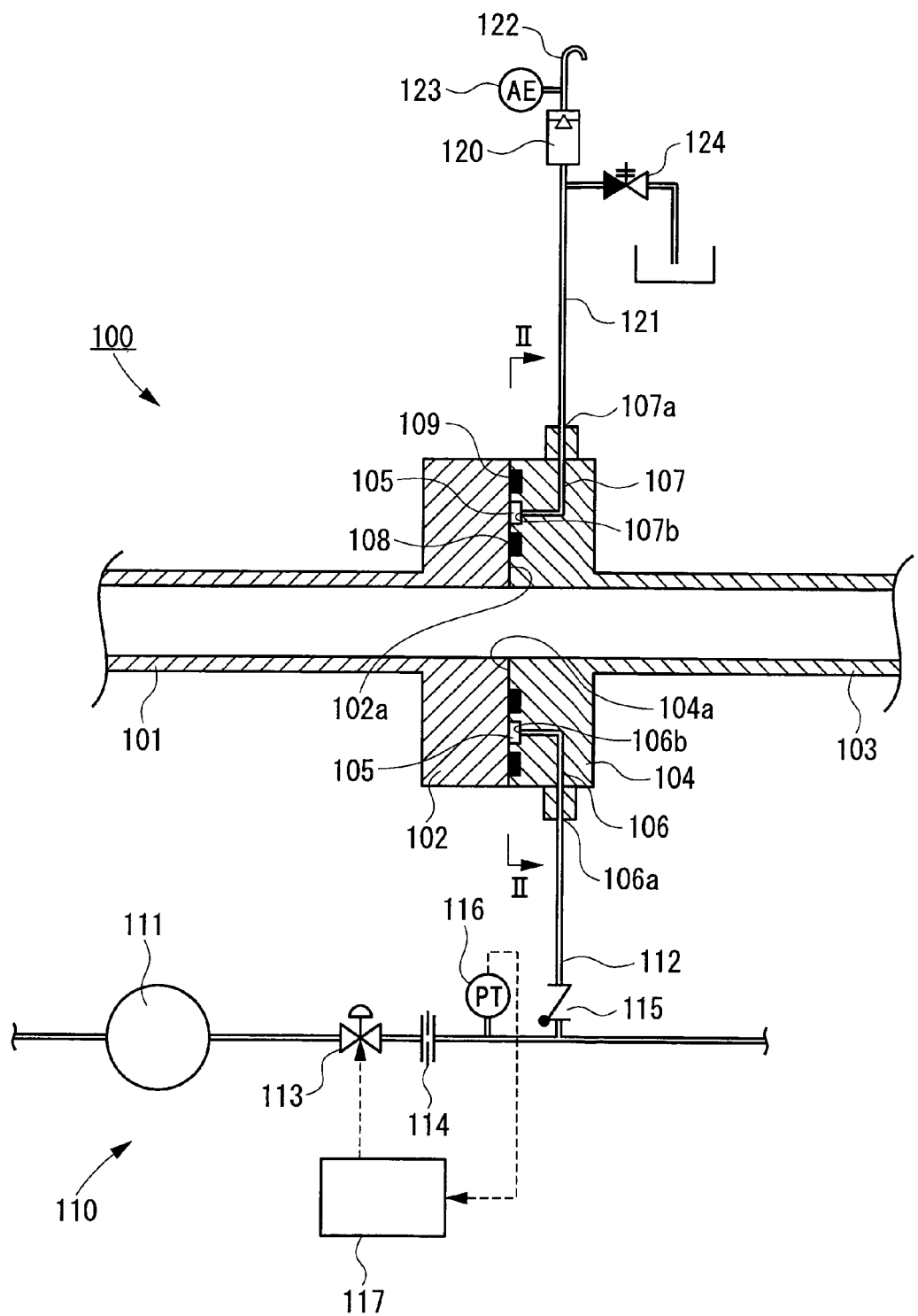
FIG. 1 is a configurational drawing showing a flange connection structure for a pipe according to Embodiment 1 of the present invention.

DESCRIPTION OF THE NUMERALS 100, 100A Flange connection structure
101, 103 Pipe 102, 104 Flange
102a, 104a Flange surface
105 Seal groove
106 Pouring passage
107, 107-1 Discharge passage
108, 109 Gasket
110 Sealing liquid pouring section
120 Discharge device
200, 200A Flange connection structure
201 Manhole
202, 204 Flange
202a, 204a Flange surface
203 Cover
205 Seal groove
206 Pouring passage
207, 207-1 Discharge passage
208, 209 Gasket

BEST MODE FOR CARRYING OUT THE
INVENTION

The best mode for carrying out the present invention will be described in detail based on the following embodiments.

Embodiment 1

Figure 2:
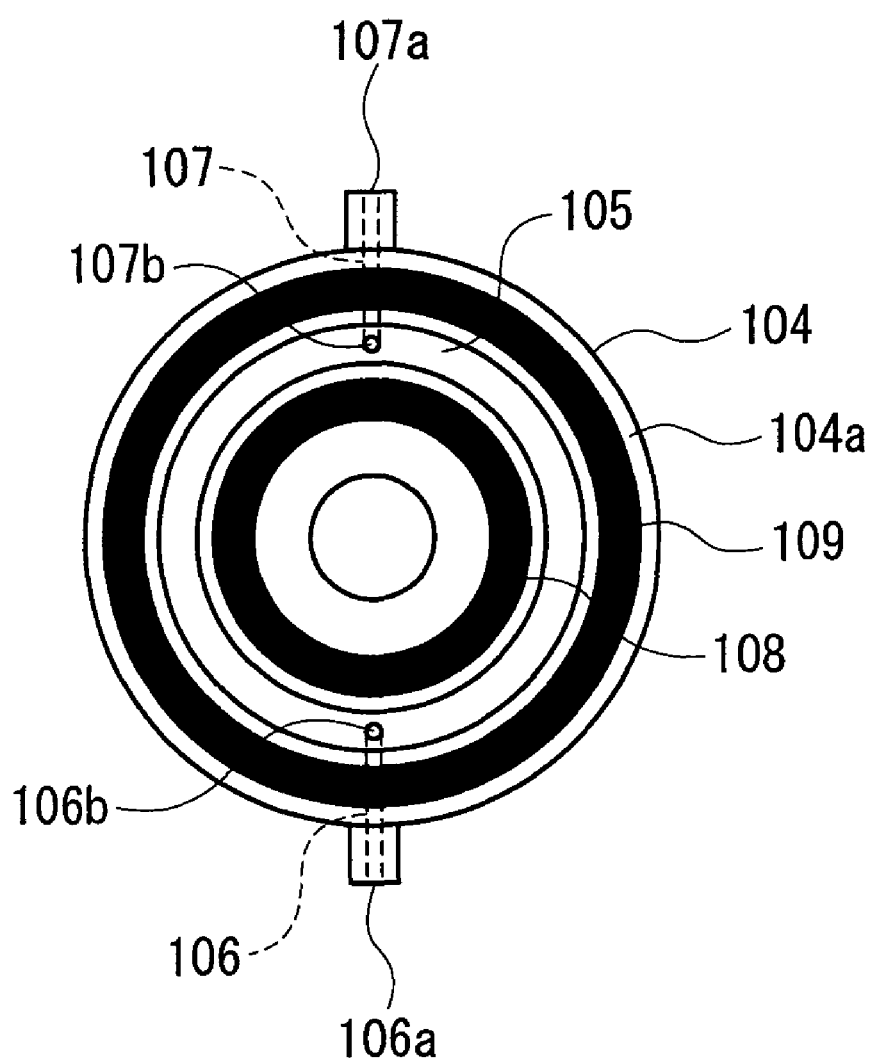
FIG. 2 is a view taken along the arrowed line II-II in FIG. 1.

FIG. 1 shows a flange connection structure 100 for a pipe according to Embodiment 1 of the present invention. FIG. 2 is a view taken along the arrowed line II-II in FIG. 1.

As shown in both drawings, a flange 102 is formed on one pipe 101, and a flange 104 is formed on another pipe 103. The flanges 102 and 104 are fastened by bolts (not shown), whereby a flange surface 102a of the flange 102 and a flange surface 104a of the flange 104 are joined together. By so doing, the pipe 101 and the pipe 103 are coupled together.

In the present embodiment, it is assumed that a combustible gas (for example, a hydrogen gas) having a positive pressure as its gas pressure is flowed through the pipes 101 and 103 connected by the flanges.

An annular seal groove 105 is formed in the flange surface 104a of the flange 104. This seal groove 105 is formed on the outer peripheral side of the inner peripheral edge of the flange 104 and in such a state as to surround the inner peripheral surface of the flange 104.

A pouring passage 106 and a discharge passage 107 are formed in the flange 104.

With respect to the circumferential direction, the pouring passage 106 and the discharge passage 107 are formed to be offset by 180°. With respect to the vertical direction, the pouring passage 106 is disposed on the lower side, and the discharge passage 107 is disposed on the upper side.

The pouring passage 106 has one end 106a opening at the circumferential surface of the outer surface of the flange 104, and has the other end 106b opening in the seal groove 105, thereby bringing the seal groove 105 and the circumferential surface of the flange into communication with each other.

The pouring passage 106 extends from the one end 106a in a nearly vertically upward direction, then bends in the horizontal direction, and reaches to the other end 106b.

The discharge passage 107 has one end 107a opening at the circumferential surface of the outer peripheral surface of the flange 104, and has the other end 107b opening in the seal groove 105, thereby bringing the seal groove 105 and the circumferential surface of the flange into communication with each other.

The discharge passage 107 extends from the one end 107a in a nearly vertically downward direction, then bends in the horizontal direction, and reaches to the other end 107b.

Annular gaskets 108, 109 are interposed between the flange surface 102a of the flange 102 and the flange surface 104a of the flange 104.

The gasket 108 is disposed on the inner peripheral side of the seal groove 105, and the gasket 109 is disposed on the outer peripheral side of the seal groove 105. The annular gasket 108, seal groove 105, and gasket 109 are arranged just concentrically.

A sealing liquid pouring section 110 has a sealing liquid pouring source 111 for ejecting a sealing liquid (for example, water or oil). An ejection port of the sealing liquid pouring source 111 and the one end 106a of the pouring passage 106 are connected by a pouring pipe 112. A control valve 113, an orifice 114, and a check valve 115 are interposed in the pouring pipe 112, and a pressure gauge 116 is mounted on the pouring pipe 112.

In the present embodiment, the pouring pressure of the sealing liquid poured from the sealing liquid pouring section 110 into the seal groove 105 via the pouring pipe 112 and the pouring passage 106 is set to be lower than the gas pressure of the combustible gas flowing through the pipes 101 and 103.

The pressure gauge 116 detects the pressure of the sealing liquid poured into the pouring passage 106, and sends the value of the detected pressure to an abnormality determination section 117. The abnormality determination section 117 determines that an abnormality occurred, if the value of the detected pressure rapidly decreased. In the event of the abnormality determination, the abnormality determination section 117 takes a safety measure, such as shutting off the flow of the fluid within the pipe 101, and closes the control valve 113.

In FIG. 1, the sealing liquid is poured from the single sealing liquid pouring source 111 into the single flange connection structure 100. However, the pouring pipe 112 can be arranged so that the sealing liquid can be poured into a plurality of the flange connection structures arranged in the pipe system.

A discharge device 120 is connected to the one end 107a of the discharge passage 107 via a discharge pipe 121. The discharge device 120 has a float mechanism and an exhaust valve.

The discharge device 120 is structured in the following manner: When the sealing liquid is sent to the discharge device 120 via the discharge pipe 121, the sealing liquid is sealed in without being discharged to the outside. If a gas is contained in the sealing liquid, however, only this gas can be discharged to the outside.

The gas discharged from the discharge device 120 is discharged to the atmosphere via an exhaust pipe 122. The position of this discharge is set in a safe place distant from the plant where the pipes 101 and 103 are laid.

A gas sensor 123 is disposed on the exhaust pipe 122. This gas sensor 123 detects the type of the gas discharged via the exhaust pipe 122.

A safety device 124 is connected to the discharge pipe 121 to discharge the sealing liquid to the outside if the pressure of the sealing liquid within the discharge pipe 121 rises abnormally.

With the flange connection structure 100 of the above configuration, when the sealing liquid is ejected and poured in from the sealing liquid pouring source 111 of the sealing liquid pouring section 110, the sealing liquid is pressure-fed into and charged into the pouring pipe 112, the pouring passage 106, the seal groove 105, the discharge passage 107, the discharge pipe 121, and the discharge device 120. On this occasion, air which has been placed in each pipe is discharged to the atmosphere via the discharge device 120.

When the sealing liquid has been pressure-fed into and charged into the annular seal groove 105 in this manner, this sealing liquid inside the seal groove 105 constitutes a liquid seal structure.

Thus, the positive pressure combustible gas flowing through the pipes 101, 103 is doubly sealed up by the gasket 108 on the inner peripheral side and the liquid seal structure comprising the sealing liquid charged into the seal groove 105.

In the flange connection structure 100, as described above, not only the gasket 108, but also the liquid seal structure comprising the sealing liquid charged into the seal groove 105 carries out sealing, thus permitting more reliable sealing.

The incidence of leaks of the combustible gas can be dramatically decreased thanks to the above sealing. Hence, the explosion-proof range surrounding the flange connection structure 100 can be restricted to a minimum.

The gasket 109 on the outer peripheral side performs the function of preventing the sealing liquid from leaking to the outside.

If the pressure of the sealing liquid is rendered lower than the gas pressure of the combustible gas flowing through the pipes 101, 103, the sealing liquid does not enter the pipes 101, 103, and the sealing liquid is preventing from mixing with the combustible gas.

Normally, double sealing by the gasket 108 on the inner peripheral side and the liquid seal structure comprising the sealing liquid charged into the seal groove 105 ensures a reliable seal, as mentioned above. If displacement or a gap occurs in the sealing surface of the gasket 108 on the inner peripheral side for some cause, such as an accident, however, the combustible gas flowing through the pipes 101, 103 may leak into the seal groove 105.

The combustible gas, which has leaked into the seal groove 105 in this manner, floats upward, while flowing through the seal groove 105, the discharge passage 107 and the discharge pipe 121, owing to a difference in specific gravity between the combustible gas and the sealing liquid, and arrives at the discharge device 120.

The discharge device 120 discharges only the combustible gas to the outside (into the atmosphere) via the exhaust pipe 122, without discharging the sealing liquid. The discharge position where the combustible gas is discharged to the atmosphere via the exhaust pipe 122 is in a safe place distant from the plant where the pipes 101, 103 are laid. Thus, discharge of the combustible gas has no problem.

When the combustible gas flows in the exhaust pipe 122, the gas sensor 123 can detect that the combustible gas has flowed through it. Upon detection of the flow-through movement of the combustible gas by the gas sensor 123, a safety measure, such as issuance of an alarm or the stoppage of passage of the combustible gas flowing through the pipes 101, 103, can be taken.

When the sealing liquid expands and its pressure becomes extremely high because of the heat of the combustible gas flowing through the pipes 101, 103 or the heat of an atmosphere surrounding the flanges, the safety device 124 is actuated to release the sealing liquid to the outside.

Even if the sealing liquid thermally expands, therefore, damage to the flanges 102, 104 or damage to the pipe or the like filled with the sealing liquid can be prevented.

If the flange 102 and the flange 104 are displaced greatly from each other, on the other hand, the sealing liquid poured into the seal groove 105 flows out in a large amount, and the value of the detected pressure detected by the pressure gauge 116 is decreased sharply.

In the event of such a sharp decrease in the value of the detected pressure, the abnormality determination section 117 determines that an abnormality occurred, takes a safety measure, such as shutting off the flow of the fluid within the pipe 101, and closes the control valve 113. By these measures, a further outflow of the sealing liquid to the outside can be prevented.

A flow meter may be installed instead of the pressure gauge 116. If the amount of the detected flow rate detected by the flow meter increased sharply, the abnormality determination section 117 may make a determination of abnormality and close the control valve 113.

The above embodiment assumes a case where the combustible gas (only the gas) is flowed through the pipes 101, 103. However, Embodiment 1 can be applied, unchanged, even in a case where a two-phase fluid having a gas and a liquid mixed is flowed through the pipes 101, 103.

Embodiment 2

Figure 3:
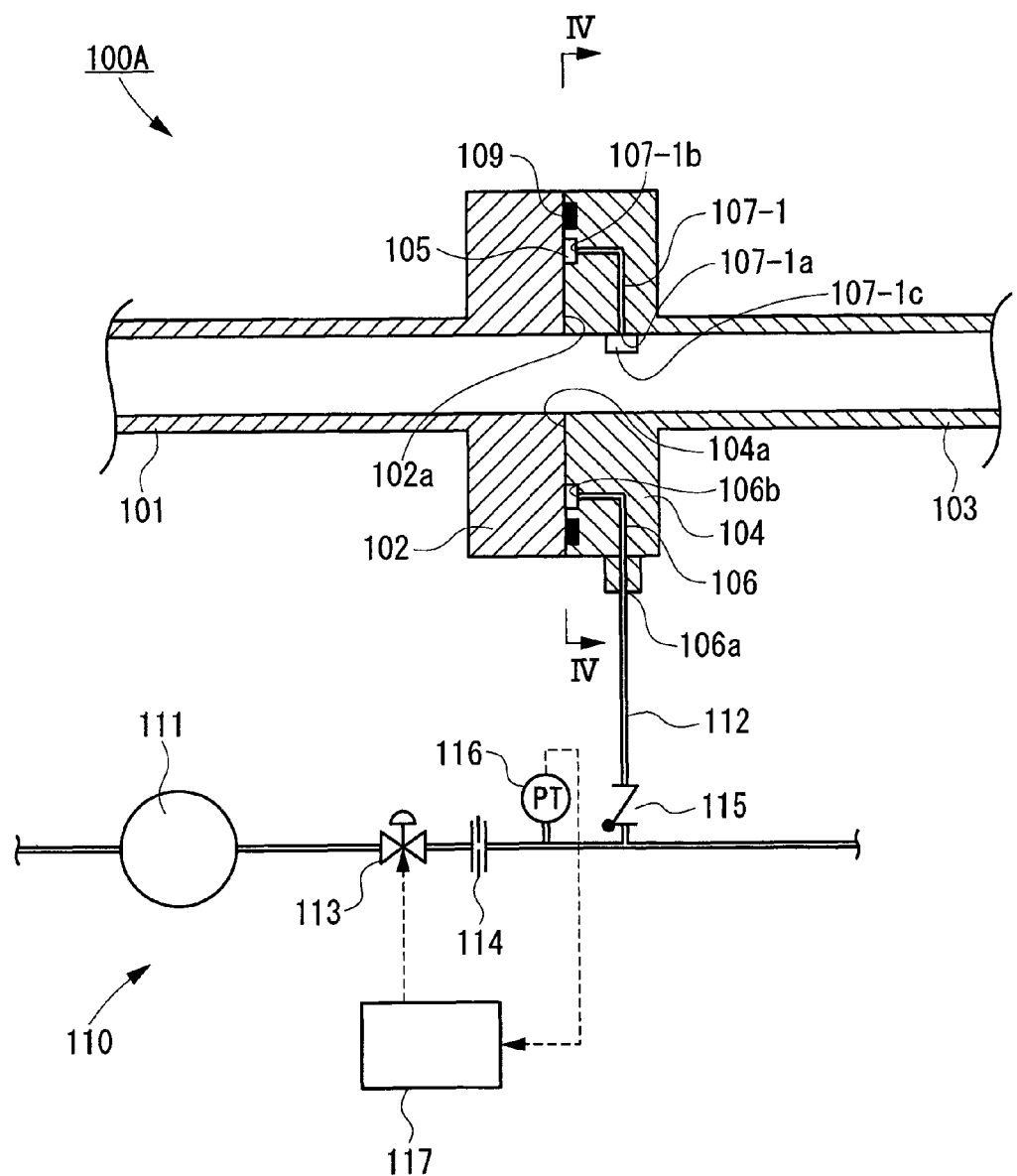
FIG. 3 is a configurational drawing showing a flange connection structure for a pipe according to Embodiment 2 of the present invention.
Figure 4:
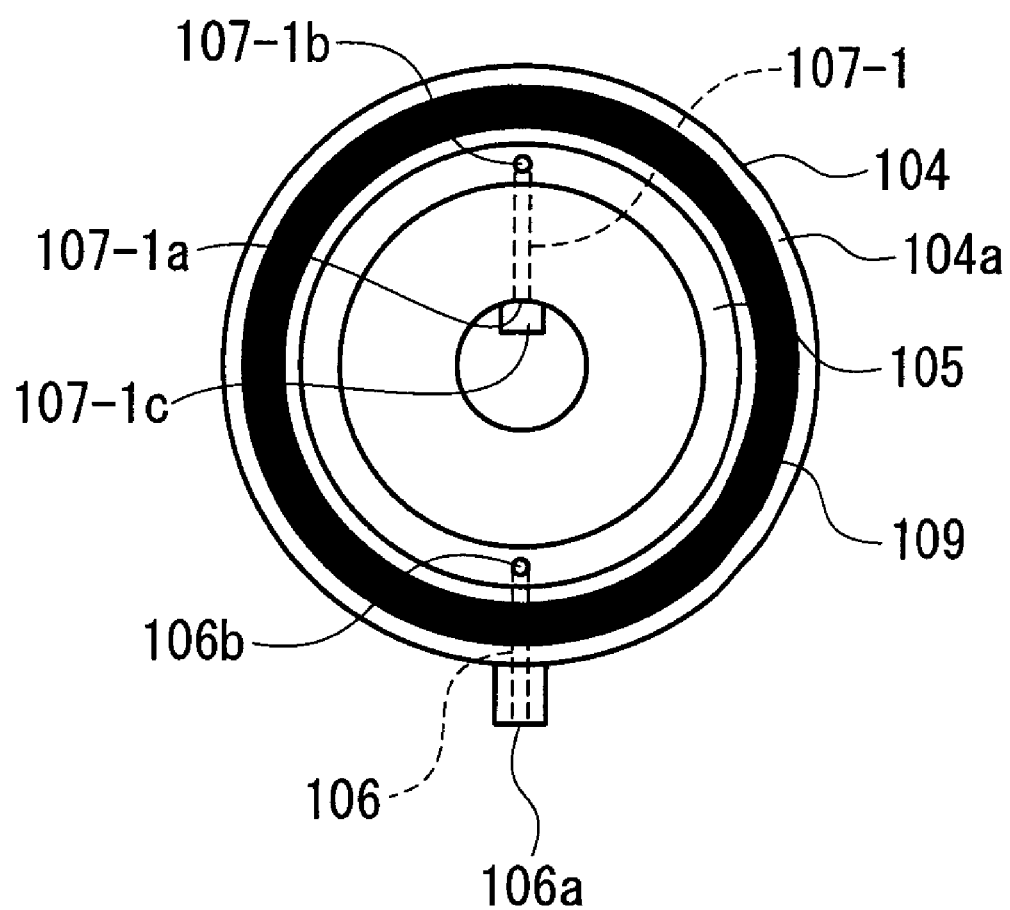
FIG. 4 is a view taken along the arrowed line IV-IV in FIG. 3.

FIG. 3 shows a flange connection structure 100A for a pipe according to Embodiment 2 of the present invention. FIG. 4 is a view taken along the arrowed line IV-IV in FIG. 3.

The same sections as those in Embodiment 1 shown in FIGS. 1 and 2 will be assigned the same numerals as in Embodiment 1, and explanations for duplicate sections will be simplified.

In the present embodiment as well, it is assumed that a combustible gas (for example, a hydrogen gas) having a positive pressure as its gas pressure is flowed through the pipes 101 and 103 connected by flanges.

An annular seal groove 105 is formed in a flange surface 104a of a flange 104. This seal groove 105 is formed on the outer peripheral side of the inner peripheral edge of the flange 104 and in such a state as to surround the inner peripheral surface of the flange 104.

A pouring passage 106 and a discharge passage 107-1 are formed in the flange 104.

The pouring passage 106 has one end 106a opening at the circumferential surface of the outer surface of the flange 104, and has the other end 106b opening in the seal groove 105, thereby bringing the seal groove 105 and the circumferential surface of the flange into communication with each other.

The discharge passage 107-1 has one end 107-1a opening in a space on the inner peripheral side of the flange 104, and has the other end 107-1b opening in the seal groove 105, thereby bringing the seal groove 105 and the space on the inner peripheral side of the flange into communication with each other.

As described above, Embodiment 2 is different from Embodiment 1 in that the one end 107-1a of the discharge passage 107-1 is open in the space on the inner peripheral side of the flange 104.

The one end 107-1a of the discharge passage 107-1 may be provided with a leakage restricting device 107-1c for restricting the leakage of the sealing liquid.

An annular gasket 109 is interposed between a flange surface 102a of a flange 102 and the flange surface 104a of the flange 104.

A sealing liquid pouring section 110 has a sealing liquid pouring source 111 for ejecting a sealing liquid (for example, water or oil), a pouring pipe 112, a control valve 113, an orifice 114, a check valve 115, a pressure gauge 116, and an abnormality determination section 117.

In the present embodiment, the pouring pressure of the sealing liquid poured from the sealing liquid pouring section 110 into the seal groove 105 via the pouring pipe 112 and the pouring passage 106 is set to be higher than the gas pressure of the combustible gas flowing through the pipes 101 and 103.

In Embodiment 1, the pouring pressure of the sealing liquid is set to be lower than the gas pressure of the combustible gas flowing through the pipes 101 and 103. Embodiment 2 is different from Embodiment 1 in that the pouring pressure of the sealing liquid is assumed to be rendered higher than the gas pressure of the combustible gas flowing through the pipes 101 and 103.

With the flange connection structure 100A of the above configuration, when the sealing liquid is ejected and poured in from the sealing liquid pouring source 111 of the sealing liquid pouring section 110, the sealing liquid is pressure-fed into and charged into the seal groove 105 via the pouring pipe 112 and the pouring passage 106. Moreover, the sealing liquid pressure-fed into and charged into the seal groove 105 is discharged into the pipe 103 via the discharge passage 107-1, and flowed through the pipe 103.

That is, the seal groove 105 is charged with the sealing liquid and, if the pressure of the sealing liquid, in particular, is rendered higher than the pressure of the fluid flowing in the pipes 101, 103, satisfactory sealing properties are obtained. The liquid leaking into the pipe 103 can also be adjusted by the leakage restricting device 107-1c. The liquid which has leaked is separated into the gas and the liquid by a suitable separator (not shown), and recovered. Thus, the use of a liquid comprising a two phase flow of a gas and a liquid as the sealing liquid is very efficient.

When the sealing liquid has been pressure-fed into and charged into the annular seal groove 105 in this manner, this sealing liquid inside the seal groove 105 constitutes a liquid seal structure.

Thus, the positive pressure combustible gas flowing through the pipes 101, 103 is reliably sealed up by the liquid seal structure comprising the high pressure sealing liquid charged into the seal groove 105.

The incidence of leaks of the combustible gas can be dramatically decreased thanks to the above sealing. Hence, the explosion-proof range surrounding the flange connection structure 100A can be restricted to a minimum.

The gasket 109 on the outer peripheral side performs the function of preventing the sealing liquid from leaking to the outside.

Normally, sealing by the liquid seal structure comprising the sealing liquid charged into the seal groove 105 ensures a reliable seal. If displacement or a gap occurs in the flange connection surface for some cause, such as an accident, however, the sealing liquid in a larger amount than the normal amount may leak into the pipes 101, 103, whereas the combustible gas does not leak to the outside.

That is, even if a gap or the like occurs in the flange connection surface, gas leaks can be prevented.

If the flange 102 and the flange 104 are displaced greatly from each other, on the other hand, the sealing liquid poured into the seal groove 105 flows out in a large amount, and the value of the detected pressure detected by the pressure gauge 116 is decreased sharply.

In the event of such a sharp decrease in the value of the detected pressure, the abnormality determination section 117 determines that an abnormality occurred, takes a safety measure, such as shutting off the flow of the fluid within the pipe 101, and closes the control valve 113. By these measures, a further outflow of the sealing liquid to the outside can be prevented.

A flow meter may be installed instead of the pressure gauge 116. If the amount of the detected flow rate detected by the flow meter increased sharply, the abnormality determination section 117 may make a determination of abnormality and close the control valve 113.

The above embodiment assumes a case where the combustible gas (only the gas) is flowed through the pipes 101, 103. However, Embodiment 2 can be applied as such even in a case where a two-phase fluid having a gas and a liquid mixed is flowed through the pipes 101, 103.

Embodiment 3

Figure 5:
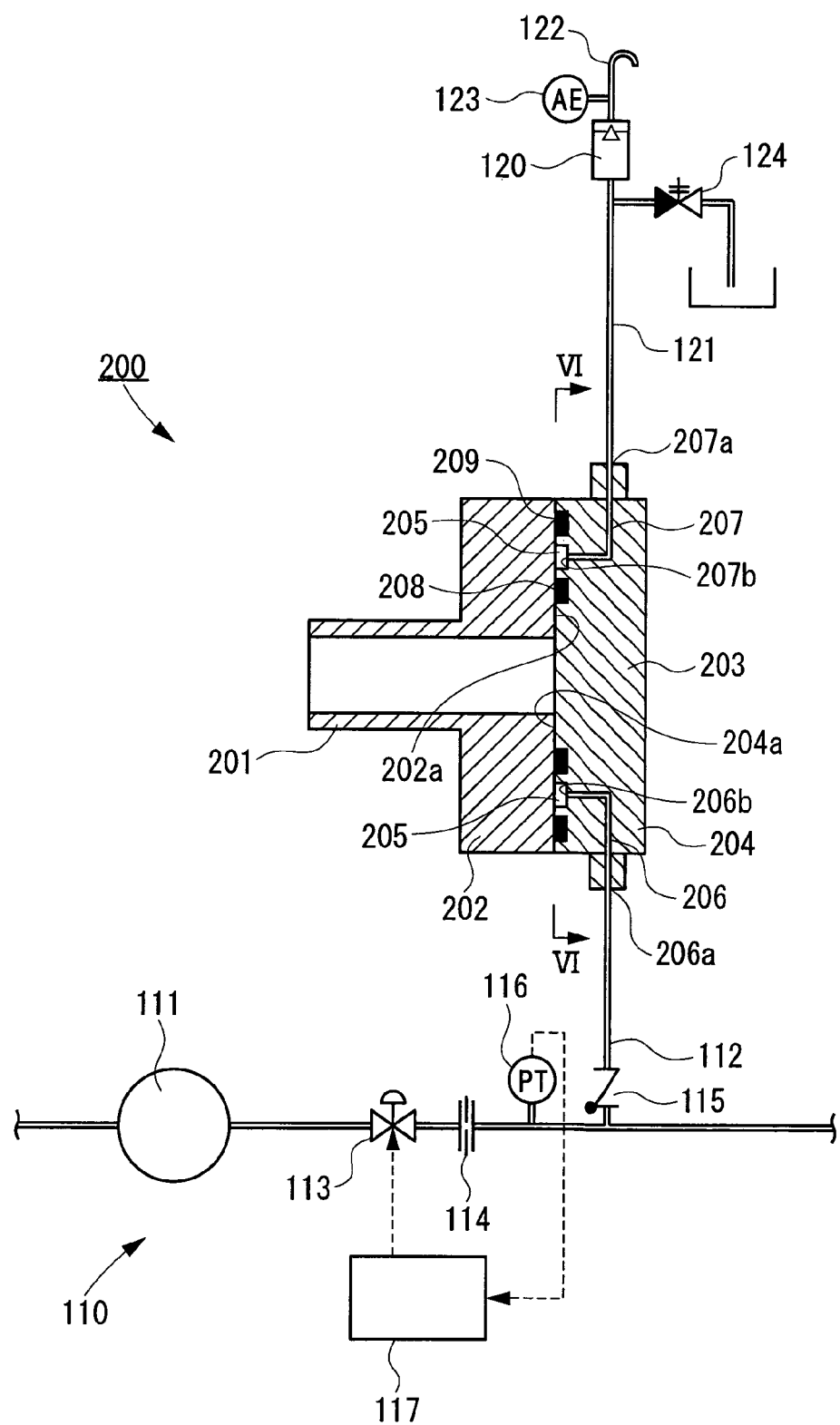
FIG. 5 is a configurational drawing showing a flange connection structure for a tank or the like according to Embodiment 3 of the present invention.
Figure 6:
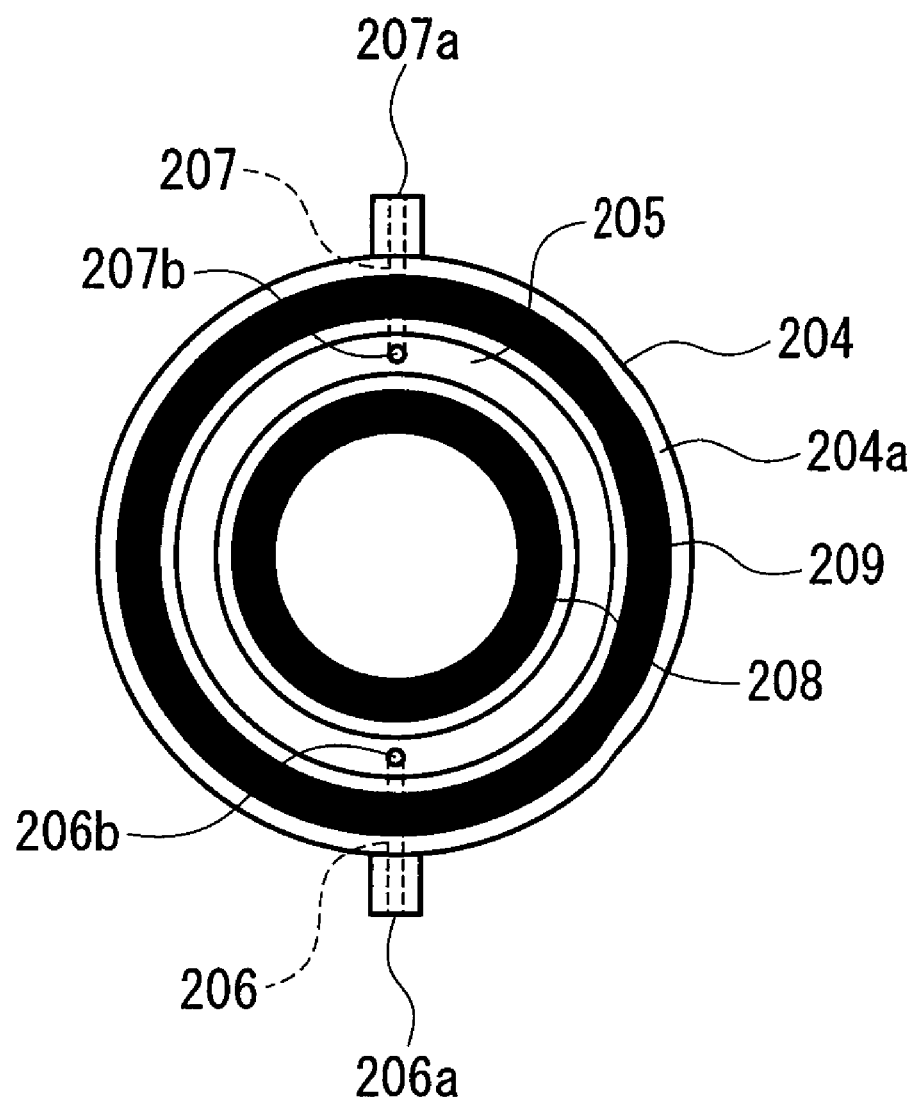
FIG. 6 is a view taken along the arrowed line VI-VI in FIG. 5.

FIG. 5 shows a flange connection structure 200 for a pipe end closing cover or a tank according to Embodiment 3 of the present invention. FIG. 6 is a view taken along the arrowed line VI-VI in FIG. 5. Sections performing the same functions as those in Embodiment 1 will be described, with the same numerals as in Embodiment 1 being assigned thereto.

As shown in both drawings, a flange 202 is formed in a manhole 201 formed in a tank (not shown), and a flange 204 is formed in a cover 203. The flanges 202 and 204 are fastened by bolts (not shown), whereby a flange surface 202a of the flange 202 and a flange 204a of the flange 204 are joined together. By so doing, the manhole 201 is closed with the cover 203.

In the present embodiment, the manhole 201 is closed with the cover 203, whereby a combustible gas (for example, a hydrogen gas), which has a positive pressure as its gas pressure and which is stored in the tank, is sealed in.

If, instead of the manhole 201, this member (manhole 201) is replaced by a pipe, the cover 203 serves as a pipe end closing cover for closing the end of this pipe, and closes the end of the pipe.

An annular seal groove 205 is formed in the flange surface 204a of the flange 204. This seal groove 205 on the side of the cover 203 is formed on the outer peripheral side of the inner peripheral edge of the flange 202 located on the side of the manhole 201 and in such a state as to surround the inner peripheral surface of the flange 202.

A pouring passage 206 and a discharge passage 207 are formed in the flange 204.

With respect to the circumferential direction, the pouring passage 206 and the discharge passage 207 are formed to be offset by 180°. With respect to the vertical direction, the pouring passage 206 is disposed on the lower side, and the discharge passage 207 is disposed on the upper side.

The pouring passage 206 has one end 206a opening at the circumferential surface of the outer surface of the flange 204, and has the other end 206b opening in the seal groove 205, thereby bringing the seal groove 205 and the circumferential surface of the flange into communication with each other.

The pouring passage 206 extends from the one end 206a in a nearly vertically upward direction, then bends in the horizontal direction, and reaches to the other end 206b.

The discharge passage 207 has one end 207a opening at the circumferential surface of the outer peripheral surface of the flange 204, and has the other end 207b opening in the seal groove 205, thereby bringing the seal groove 205 and the circumferential surface of the flange into communication with each other.

The discharge passage 207 extends from the one end 207a in a nearly vertically downward direction, then bends in the horizontal direction, and reaches to the other end 207b.

Annular gaskets 208, 209 are interposed between the flange surface 202a of the flange 202 and the flange surface 204a of the flange 204.

The gasket 208 is disposed on the inner peripheral side of the seal groove 205, and the gasket 209 is disposed on the outer peripheral side of the seal groove 205. The annular gasket 208, seal groove 205, and gasket 209 are arranged just concentrically.

A sealing liquid pouring section 110 has a sealing liquid pouring source 111 for ejecting a sealing liquid (for example, water or oil). An ejection port of the sealing liquid pouring source 111 and the one end 206a of the pouring passage 206 are connected by a pouring pipe 112. A control valve 113, an orifice 114, and a check valve 115 are interposed in the pouring pipe 112, and a pressure gauge 116 is mounted on the pouring pipe 112.

In the present embodiment, the pouring pressure of the sealing liquid poured from the sealing liquid pouring section 110 into the seal groove 205 via the pouring pipe 112 and the pouring passage 206 is set to be lower than the gas pressure of the combustible gas in the tank.

The pressure gauge 116 detects the pressure of the sealing liquid poured into the pouring passage 206, and sends the value of the detected pressure to an abnormality determination section 117. The abnormality determination section 117 detects that an abnormality occurred, if the value of the detected pressure rapidly decreased. In the event of the abnormality determination, the abnormality determination section 117 takes a safety measure, such as issuing an alarm, and closes the control valve 113.

A discharge device 120 is connected to the one end 207a of the discharge passage 207 via a discharge pipe 121. The discharge device 120 has a float mechanism and an exhaust valve.

The discharge device 120 is structured in the following manner: When the sealing liquid is sent to the discharge device 120 via the discharge pipe 121, the sealing liquid is sealed in without being discharged to the outside. If a gas is contained in the sealing liquid, only this gas can be discharged to the outside.

The gas discharged from the discharge device 120 is discharged to the atmosphere via an exhaust pipe 122. The discharge position is set in a safe place distant from the plant where the tank is disposed.

A gas sensor 123 is disposed on the exhaust pipe 122. This gas sensor 123 detects the type of the gas discharged via the exhaust pipe 122.

A safety device 124 is connected to the discharge pipe 121 to discharge the sealing liquid to the outside if the pressure of the sealing liquid within the discharge pipe 121 rises abnormally.

With the flange connection structure 200 of the above configuration, when the sealing liquid is ejected and poured in from the sealing liquid pouring source 111 of the sealing liquid pouring section 110, the sealing liquid is pressure-fed into and charged into the pouring pipe 112, the pouring passage 206, the seal groove 205, the discharge passage 207, the discharge pipe 121, and the discharge device 120. On this occasion, air which has been placed in each pipe is discharged to the atmosphere via the discharge device 120.

When the sealing liquid has been pressure-fed into and charged into the annular seal groove 205 in this manner, this sealing liquid inside the seal groove 205 constitutes a liquid seal structure.

Thus, the positive pressure combustible gas stored in the tank is doubly sealed up by the gasket 208 on the inner peripheral side and the liquid seal structure comprising the sealing liquid charged into the seal groove 205.

In the flange connection structure 200, as described above, not only the gasket 208, but also the liquid seal structure comprising the sealing liquid charged into the seal groove 205 carries out sealing, thus permitting more reliable sealing.

The incidence of leaks of the combustible gas can be dramatically decreased thanks to the above sealing. Hence, the explosion-proof range surrounding the flange connection structure 200 can be restricted to a minimum.

The gasket 209 on the outer peripheral side performs the function of preventing the sealing liquid from leaking to the outside.

If the pressure of the sealing liquid is rendered lower than the gas pressure of the combustible gas stored in the tank, the sealing liquid does not enter the tank, and the sealing liquid is preventing from mixing with the combustible gas.

Normally, double sealing by the gasket 208 on the inner peripheral side and the liquid seal structure comprising the sealing liquid charged into the seal groove 205 ensures a reliable seal, as mentioned above. If displacement or a gap occurs in the sealing surface of the gasket 208 on the inner peripheral side for some cause, such as an accident, however, the combustible gas inside the tank may leak into the seal groove 205.

The combustible gas, which has leaked into the seal groove 205 in this manner, floats upward, while flowing through the seal groove 205, the discharge passage 207 and the discharge pipe 121, owing to a difference in specific gravity between the combustible gas and the sealing liquid, and arrives at the discharge device 120.

The discharge device 120 discharges only the combustible gas to the outside (into the atmosphere) via the exhaust pipe 122, without discharging the sealing liquid. The discharge position where the combustible gas is discharged to the atmosphere via the exhaust pipe 122 is in a safe place distant from the plant where the tank is disposed. Thus, discharge of the combustible gas causes no problem.

When the combustible gas flows in the exhaust pipe 122, the gas sensor 123 can detect that the combustible gas has passed. Upon detection of the passage of the combustible gas by the gas sensor 123, a safety measure, such as issuance of an alarm, can be taken.

When the sealing liquid expands and its pressure becomes extremely high because of the heat of the combustible gas inside the tank or the heat of an atmosphere surrounding the flanges, the safety device 124 is actuated to release the sealing liquid to the outside.

Even if the sealing liquid thermally expands, therefore, damage to the flanges 202, 204 or damage to the pipe or the like filled with the sealing liquid can be prevented.

If the flange 202 and the flange 204 are displaced greatly from each other, on the other hand, the sealing liquid poured into the seal groove 205 flows out in a large amount, and the value of the detected pressure detected by the pressure gauge 116 is decreased sharply.

In the event of such a sharp decrease in the value of the detected pressure, the abnormality determination section 117 determines that an abnormality occurred, and closes the control valve 113. By this measure, a further outflow of the sealing liquid to the outside can be prevented.

A flow meter may be installed instead of the pressure gauge 116. If the amount of the detected flow rate detected by the flow meter increased sharply, the abnormality determination section 117 may make a determination of abnormality and take a safety measure, such as issuance of an alarm, or close the control valve 113.

The above embodiment assumes a case where the combustible gas (only the gas) is stored in the tank. However, Embodiment 3 can be applied as such even in a case where a two-phase fluid comprising a mixture of a gas and a liquid is stored in the tank.

In the foregoing descriptions and in FIG. 5, the seal groove 205, pouring passage 206, discharge passage 207, etc. are provided in the cover 203, but may be provided in the flange 202, if desired.

Embodiment 4

Figure 7:
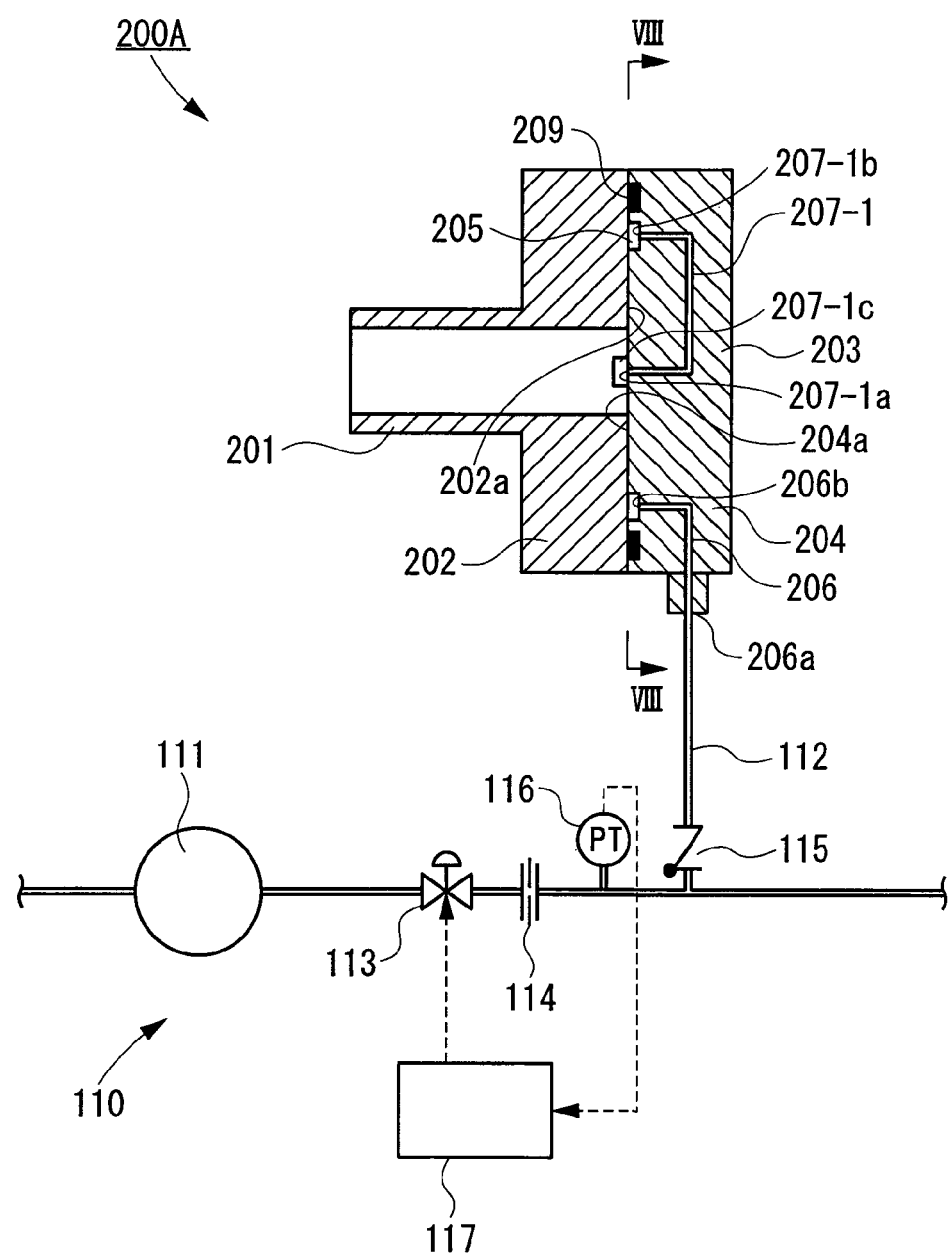
FIG. 7 is a configurational drawing showing a flange connection structure for a tank or the like according to Embodiment 4 of the present invention.
Figure 8:
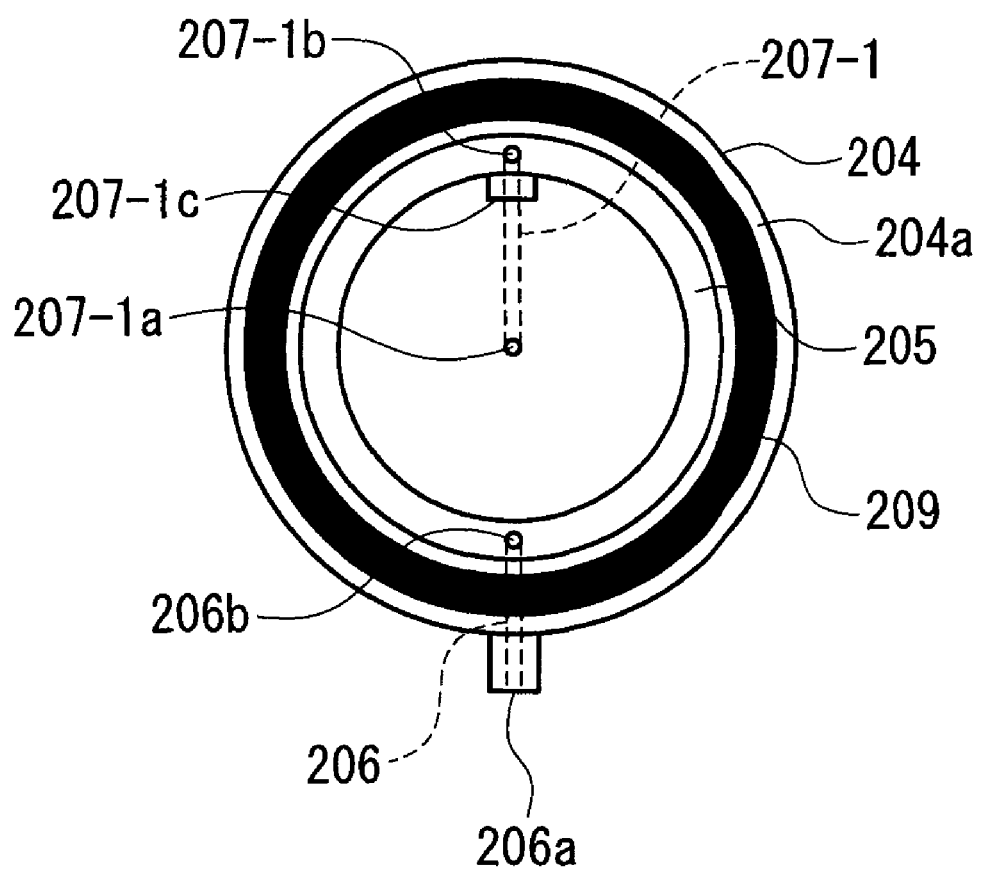
FIG. 8 is a view taken along the arrowed line VIII-VIII in FIG. 7.
Figure 9:
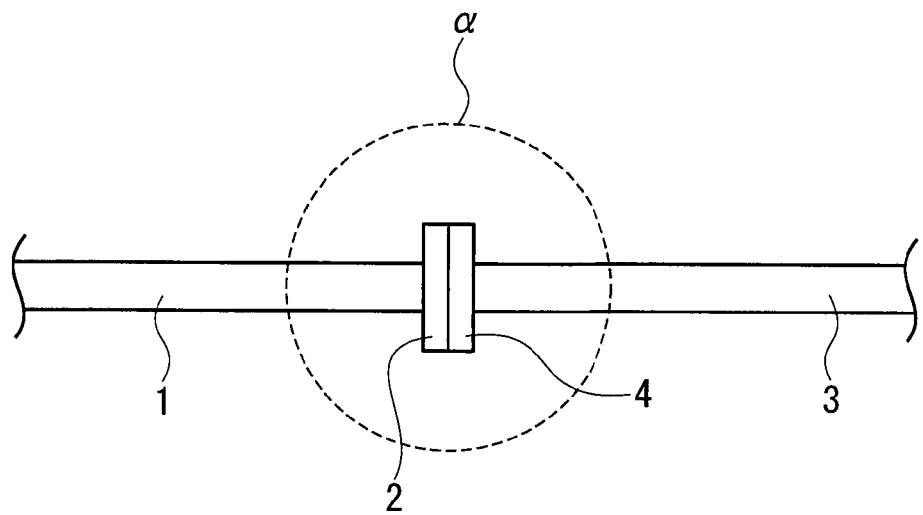
FIG. 9 is a configurational drawing showing a conventional flange connection structure applied to pipes.
Figure 10:
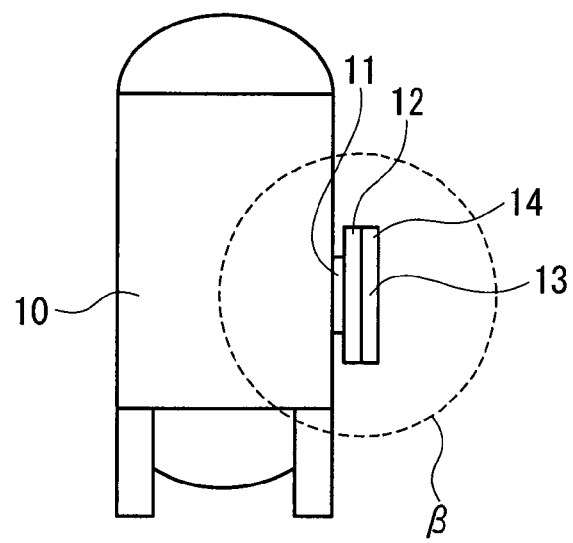
FIG. 10 is a configurational drawing showing a conventional flange connection structure applied to a tank.

FIG. 7 shows a flange connection structure 200A for a pipe end closing cover or a tank according to Embodiment 4 of the present invention. FIG. 8 is a view taken along the arrowed line VIII-VIII in FIG. 7.

The same sections as those in Embodiment 3 shown in FIGS. 5 and 6 will be assigned the same numerals as in Embodiment 3, and explanations for duplicate sections will be simplified.

In the present embodiment as well, a combustible gas (for example, a hydrogen gas), which has a positive pressure as its gas pressure, is stored in a tank (not shown) having a manhole 201 closed with a cover 203.

If, instead of the manhole 201, this member (manhole 201) is replaced by a pipe, the cover 203 serves as a pipe end closing cover for closing the end of this pipe, and closes the end of the pipe.

An annular seal groove 205 is formed in a flange surface 204a of a flange 204 of the cover 203. This seal groove 205 on the side of the cover 203 is formed on the outer peripheral side of the inner peripheral edge of a flange 202 on the side of the manhole 201 and in such a state as to surround the inner peripheral surface of the flange 202.

A pouring passage 206 and a discharge passage 207-1 are formed in the flange 204.

The pouring passage 206 has one end 206a opening at the circumferential surface of the outer surface of the flange 204, and has the other end 206b opening in the seal groove 205, thereby bringing the seal groove 205 and the circumferential surface of the flange into communication with each other.

The discharge passage 207-1 has one end 207-1a opening in a space on the inner peripheral side of the manhole 201, and has the other end 207-1b opening in the seal groove 205, thereby bringing the seal groove 205 and the space on the inner peripheral side of the manhole 201 into communication with each other.

As described above, Embodiment 4 is different from Embodiment 3 in that the one end 207-1a of the discharge passage 207-1 is open in the space on the inner peripheral side of the manhole 201.

The one end 207-1a of the discharge passage 207-1 may be provided with a sealing liquid leakage restricting device 207-1c.

An annular gasket 209 is interposed between a flange surface 202a of the flange 202 and the flange surface 204a of the flange 204.

A sealing liquid pouring section 110 has a sealing liquid pouring source 111 for ejecting a sealing liquid (for example, water or oil), a pouring pipe 112, a control valve 113, an orifice 114, a check valve 115, a pressure gauge 116, and an abnormality determination section 117.

In the present embodiment, the pouring pressure of the sealing liquid poured from the sealing liquid pouring section 110 into the seal groove 205 via the pouring pipe 112 and the pouring passage 206 is set to be higher than the gas pressure of the combustible gas inside the tank.

Embodiment 3 is based on the assumption that the pouring pressure of the sealing liquid is set to be lower than the gas pressure of the combustible gas inside the tank. Embodiment 4 is different from Embodiment 3 in that the pouring pressure of the sealing liquid is assumed to be rendered higher than the gas pressure of the combustible gas inside the tank.

With the flange connection structure 200A of the above configuration, if the sealing liquid is poured from the sealing liquid pouring source 111 of the sealing liquid pouring section 110 into the seal groove 205, and held to be higher than the internal pressure, the sealing properties are enhanced. The sealing liquid which has leaked into the manhole 201 is separated into the gas and the liquid by a suitable separator (not shown), and recovered. Thus, it is efficient to use a liquid comprising a two phase flow of a gas and a liquid as the sealing liquid.

When the sealing liquid has been pressure-fed into and charged into the annular seal groove 205 in this manner, this sealing liquid inside the seal groove 205 constitutes a liquid seal structure.

Thus, the positive pressure combustible gas inside the tank is reliably sealed up by the liquid seal structure comprising the high pressure sealing liquid charged into the seal groove 205.

The incidence of leaks of the combustible gas can be dramatically decreased thanks to the above sealing. Hence, the explosion-proof range surrounding the flange connection structure 200A can be restricted to a minimum.

The gasket 209 on the outer peripheral side performs the function of preventing the sealing liquid from leaking to the outside.

Normally, sealing by the liquid seal structure comprising the sealing liquid charged into the seal groove 205 ensures a reliable seal, as stated above. If displacement or a gap occurs in the flange connection surface for some cause, such as an accident, however, the sealing liquid in a larger amount than the normal amount may leak into the manhole 201, whereas the combustible gas does not leak to the outside.

That is, even if a gap or the like occurs in the flange connection surface, gas leaks can be prevented.

If the flange 202 and the flange 204 are displaced greatly from each other, on the other hand, the sealing liquid poured into the seal groove 205 flows out in a large amount, and the value of the detected pressure detected by the pressure gauge 116 is decreased sharply.

In the event of such a sharp decrease in the value of the detected pressure, the abnormality determination section 117 determines that an abnormality occurred, takes a safety measure, such as issuing an alarm, and closes the control valve 113. By so doing, a further outflow of the sealing liquid to the outside can be prevented.

A flow meter may be installed instead of the pressure gauge 116. If the amount of the detected flow rate detected by this flow meter increased sharply, the abnormality determination section 117 may make a determination of abnormality and take a safety measure, such as issuance of an alarm, or close the control valve 113.

The above embodiment assumes a case where the combustible gas (only the gas) is stored in the tank. However, Embodiment 4 can be applied as such even in a case where a two-phase fluid comprising a gas and a liquid mixed is stored in the tank.

In the foregoing descriptions and in FIG. 7, the seal groove 205, pouring passage 206, discharge passage 207, etc. are provided in the cover 203, but may be provided in the flange 202, if desired.

The invention claimed is:

1. A flange connection structure including a flange formed in a pipe for flowing a fluid therethrough, and a flange formed in another pipe for flowing the fluid therethrough, the flanges being fastened by bolts, whereby flange surfaces of the flanges are joined together to couple the pipes together, or a flange connection structure including a flange formed in a manhole of a tank for storing a fluid and a flange formed in a cover, the flanges being fastened by bolts, whereby flange surfaces of the flanges are joined together to close the manhole with the cover, or a flange connection structure including a flange formed in a pipe and a flange formed in a cover, the flanges being fastened by bolts, whereby flange surfaces of the flanges are joined together to close the pipe with the cover, the flange connection structure, comprising:

an annular seal groove formed in the flange surface of one of the flanges;

a pouring passage formed in the one of the flanges for bringing the seal groove and an outer surface of the one of the flanges into communication with each other;

a discharge passage formed in the one of the flanges for bringing the seal groove and the outer surface of the one of the flanges into communication with each other;

sealing liquid pouring means connected to the pouring passage for pouring a sealing liquid into the seal groove; and a discharge device connected to the discharge passage for discharging a gas contained in the sealing liquid to an outside, while preventing the sealing liquid, which has exited from the discharge passage, from being released to the outside.

2. The flange connection structure according to claim 1, wherein the sealing liquid pouring means is equipped with pressure detection means for detecting a pressure of the sealing liquid poured into the pouring passage, or flow rate detection means for detecting a flow rate of the sealing liquid poured into the pouring passage, and the flange connection structure further comprising abnormality determination means which determines that an abnormality occurred in joining of the flanges if there was a sharp decrease in the pressure detected by the pressure detection means, or if there was a sharp increase in the flow rate detected by the flow rate detection means.

3. A flange connection structure including a flange formed in a pipe for flowing a fluid therethrough, and a flange formed in another pipe for flowing the fluid therethrough, the flanges being fastened by bolts, whereby flange surfaces of the flanges are joined together to couple the pipes together, or a flange connection structure including a flange formed in a manhole of a tank for storing a fluid and a flange formed in a cover, the flanges being fastened by bolts, whereby flange surfaces of the flanges are joined together to close the manhole with the cover, or a flange connection structure including a flange formed in a pipe and a flange formed in a cover, the flanges being fastened by bolts, whereby flange surfaces of the flanges are joined together to close the pipe with the cover, the flange connection structure, comprising:

an annular seal groove formed in the flange surface of one of the flanges;

a pouring passage formed in the one of the flanges for bringing the seal groove and an outer surface of the one of the flanges into communication with each other;

a discharge passage formed in the one of the flanges for bringing the seal groove and a space, which is located on an inner peripheral side of the flange and in which the fluid is present, into communication with each other; and sealing liquid pouring means connected to the pouring passage for pouring a sealing liquid into the seal groove.

4. The flange connection structure according to claim 3, wherein a pouring pressure of the sealing liquid poured in by the sealing liquid pouring means is set to be higher than a fluid pressure of the fluid.

5. The flange connection structure according to claim 3, further comprising a leakage restriction device.

* * * * *